Nov. 23, 1954  H. B. MARVIN  2,695,363
METHOD AND APPARATUS FOR MEASURING IONIZING RADIATIONS
Filed March 1, 1950  2 Sheets-Sheet 1
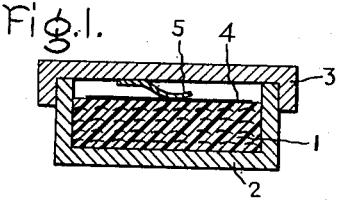
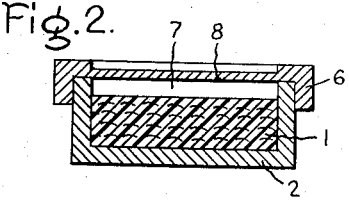
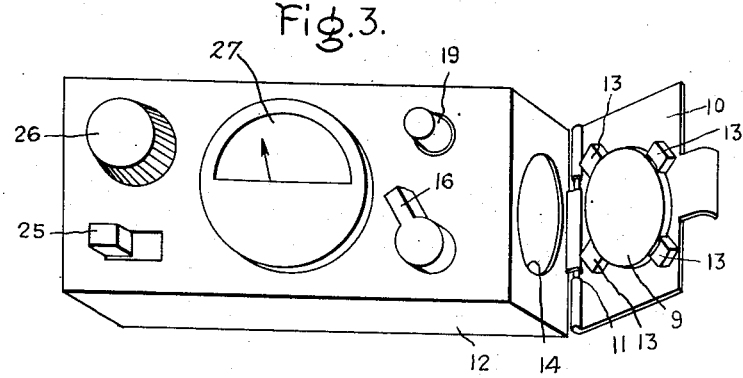
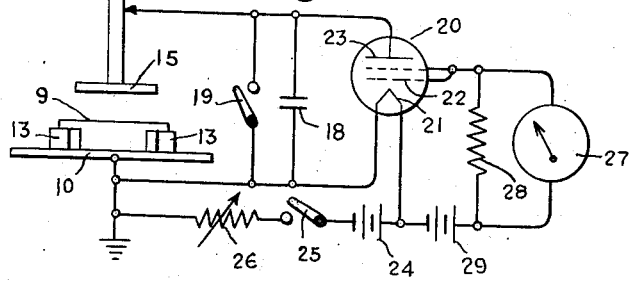
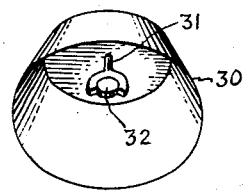
Inventor:
Harry B. Marvin,
by Paul A. Frank
His Attorney.

Nov. 23, 1954    H. B. MARVIN    2,695,363
METHOD AND APPARATUS FOR MEASURING IONIZING RADIATIONS
Filed March 1, 1950    2 Sheets-Sheet 2
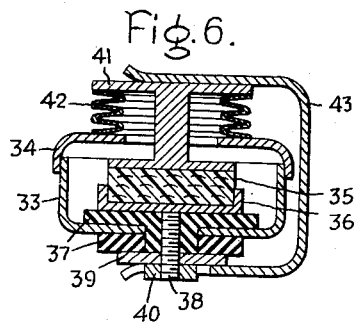
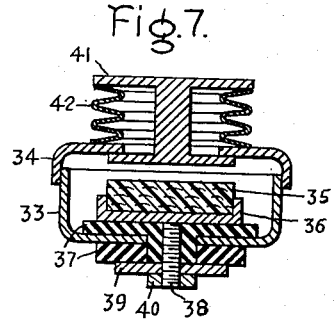
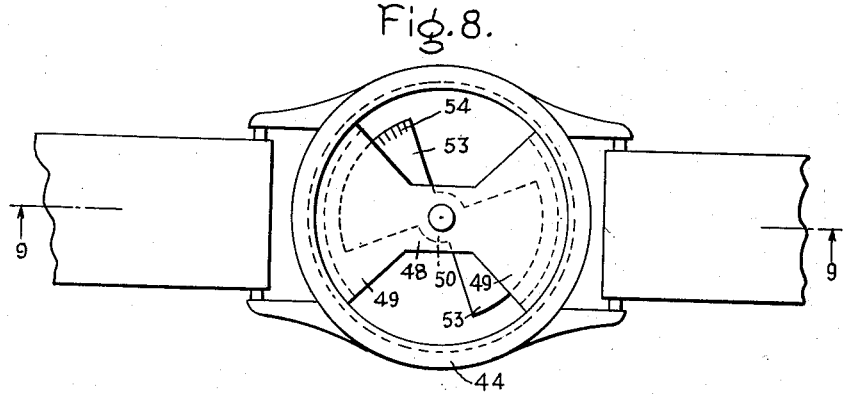
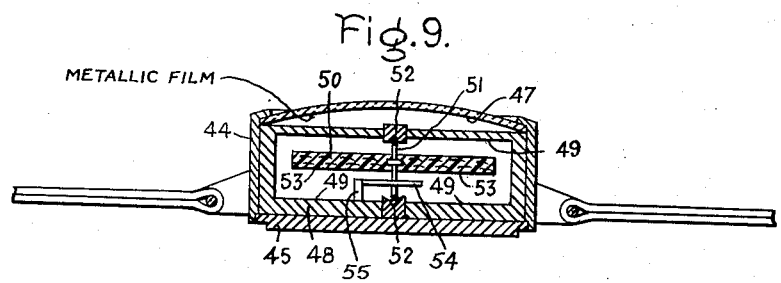
Inventor:
Harry B Marvin,
by Paul A. Frank
His Attorney.

2,695,363
Patented Nov. 23, 1954

United States Patent Office

2,695,363

METHOD AND APPARATUS FOR MEASURING IONIZING RADIATIONS

Harry B. Marvin, Syracuse, N. Y., assignor to General Electric Company, a corporation of New York Application March 1, 1950, Serial No. 147,118

11 Claims. (Cl. 250—83.6)

This invention relates to improved method and apparatus for measuring ionizing radiations such as X-rays, gamma rays, beta rays and alpha rays.

The term "electret" has been applied to electrically insulating materials capable of retaining electric charges for long periods of time. One of the best known electret materials is carnauba wax. However, many plastic materials, such as Fluorothene, also make good electrets, and may be preferred in some instances. The primary charge of an electret is due to an internal molecular arrangement of the material, and hence is bound within the volume of the electret. Hence, this charge is not appreciably reduced by handling the electret, or even by shorting the surfaces of the electret with an electrical conductor. In fact, shorting the electret helps to preserve the charge.

Upon exposure to air, the apparent charge of an electret, such as the charge measured with an electrometer connected between opposite surfaces of the electret, gradually decreases. This apparent decrease in charge is not principally due to any substantial change in the charges within the volume of the electret, but rather to the collection of surface charges which tend to neutralize the internal charges. The accumulation of these surface charges is principally due to ions in the air which are attracted to the surface of the electret by the internal charges.

It is known that the apparent charge of an electret is reduced when the electret is exposed to high energy radiations such as X-rays. Heretofore, it has been considered that this decrease is primarily due to dissipation of the internal charges by molecular re-arrangements which occur under influence of the radiations. It is now discovered that the dissipation of internal charges is relatively small for moderate radiation exposures, and that the major reduction in apparent charge is due to the attraction of ions, produced by the radiation, to the surface of the electret, where the ions produce surface charges which tend to neutralize the internal charges.

According to the present invention, ionizing radiations are measured by providing a container enclosing a fixed amount of gas, such as air, within which ions are produced by the radiations to be measured. An electret is provided within the container which attracts the ions to its surface, thereby reducing the apparent charge of the electret. The reduction in apparent charge of the electret is measured to determine the amount of ionizing radiation to which the container has been exposed.

An object of this invention is to provide improved means for measuring ionizing radiations.

Another object is to provide improved apparatus for measuring the apparent charge of electrets.

Other objects and advantages will become apparent as the description proceeds. The features of this invention which are believed to be novel and patentable are pointed out in claims which form a part of this specification.

For a better understanding of the invention, reference is made in the following description to the accompanying drawings, in which Fig. 1 is a vertical section of an electret and a storage container therefor; Fig. 2 is a vertical section of an electret and a container therefor for measuring ionizing radiations; Fig. 3 is a perspective view of improved apparatus for measuring the charge of an electret; Fig. 4 is a schematic diagram of the Fig. 3 apparatus; Fig. 5 is a perspective view of an electret and a container therefor for measuring radiations of low penetrating power, such as alpha rays, emitted from a surface; Fig. 6 is a vertical section of an electret and an improved container therefor showing the electret shorted for storage purposes; Fig. 7 is a vertical section of the same electret and container showing the electret unshorted for radiation measuring purposes; Fig. 8 is a plan view of improved apparatus for measuring ionizing radiations; and Fig. 9 is a section along line 9—9 of Fig. 8.

Referring now to Fig. 1, a disc-shaped electret 1 may be stored in a metal container comprising a bottom portion 2 and a lid 3. A sheet of metal foil 4 covers the top surface of the electret, and electrical contact between the metal case and the foil is maintained by a spring 5. This container keeps the surfaces of the electret short circuited and thereby maintains the charge of the electret by preventing the attraction of ions to its surface. In a sense, the short circuiting of the electret preserves its charge just as a keeper preserves the magnetism of a permanent magnet. Electrets may be stored in this manner for long periods of time—several years, for example—without appreciable reduction of their charge.

When it is desired to use the electret to measure radiations, the short circuit is removed. This preferably is done by removing foil 4 and replacing top 3 with another top 6, which does not have a spring connection, as shown in Fig. 2. The foil 4 may be left on top of the electret so long as it does not make electrical contact with the walls of the container, and thus does not provide an electrical short circuit. However, it is preferable to remove the foil before exposure to the radiations to be measured, since the foil affects the electric field in its vicinity and its presence may affect the exposure reading subsequently taken. If the foil is removed, the same top 3 may be used in both instances, if desired; since without the foil, spring 5 short circuits only the small portion of the electret surface which it touches.

When the electret is not short circuited, as shown in Fig. 2, the charges within the electret produce an electrostatic field which attracts to the surface of the electret any ions which may be produced within the air space 7 between the top of the electret and the cover 6 of the container. Ions produced outside the container are not attracted, because of the shielding of the container which prevents the electrostatic field of the electret from extending outside the container and which also inhibits the accidental passage of ions from the outside of the container to the electret.

Since the amount of air within space 7 is fixed by the dimensions of the container, only those ions produced within a fixed amount of air are attracted to the electret surface. This is, except for the small number of ions which may be initially present in the air within space 7, substantially all of the ions attracted to the electret's surface are produced by ionizing radiations entering space 7. Cover 6 may be provided with a relatively thin portion 8 to permit ionizing radiations to enter the container more easily. Therefore, the reduction in the apparent charge of the electret, determined by measuring such charge before and after exposure to radiation, is a measure of the ionizing radiations which entered space 7 during the exposure period.

After exposure to the radiations to be measured, foil 4 is replaced and cover 3 is replaced on the container. Spring 5 then keeps the electret short circuited until such time as may be convenient to measure the electret charge. While the electret is short circuited, there is substantially no change in the apparent charge of the electret, because the electrostatic field external to the electret is short circuited likewise, and hence there is no tendency of the electret to attract ions to its surface. Ions formed within space 7 while the electret is short circuited are therefore relatively immobile and quickly recombine into electrically neutral molecules.

Improved apparatus for measuring the apparent charge of an electret is shown in Figs. 3 and 4. The electret 9, the apparent charge of which is to be measured, is placed in an electret holder 10, which may be attached by hinge 11 to the case 12 of the apparatus, as shown in Fig. 3. Lugs 13 may be provided to hold the electret 9 in place on holder 10. After the electret is placed in the holder, the holder is turned about hinge 11 to bring the inner face of the electret adjacent to an opening 14 in the end of case 12. Inside the case there is a movable plate 15 (Fig. 4), which is positioned adjacent to and contacts the inner face of the electret when lever 16 is operated, and which moves a fixed distance away from the electret when lever 16 is released. Suitable mechanical linkage, indicated by broken lines 17, is provided between lever 16 and plate 15 for effecting this motion.

Plate 15 is electrically insulated from the case. Capacitor 18 and a short circuiting switch 19 in parallel therewith are connected between movable plate 15 and holder 10. An electron discharge tube 20, having a cathode 21, a grid 22, and an anode 23, has its anode connected to plate 15 and its cathode connected to holder 10. Tube 20 preferably is of the so-called "electrometer" type designed for operation as an inverted triode, and may have a filament type cathode and have dual grids connected in parallel, as indicated in the drawing. Filament current for tube 20 may be provided by a battery 24 connected in series with a switch 25 and a variable resistor 26, as shown. Adjustment of resistor 26 controls the amount of current supplied to filament 21, and thus controls the filament emission of the tube. Connected between grid 22 and cathode 21 is a microammeter 27 in parallel with a resistor 28. Positive bias potential is applied to grid 22 by battery 29. Switch 25 operates as an "on-off" switch to conserve the batteries when the apparatus is not in operation.

When switch 19 is closed, anode 23 and cathode 21 are at the same potential, and grid 22, being positive, draws relatively large grid current. Resistor 26 may be adjusted for maximum deflection of instrument 27 under these conditions.

Assuming that an electret 9 is placed in holder 10 with such polarity that the upper surface of the electret is positive, lever 16 is operated and plate 15 is brought into contact with the positive upper surface of the electret. The positive charges in the electret induce negative charges in plate 15. Current therefore flows from plate 15 through tube 20, and because of the low resistance of the tube to current flowing in this direction, the potential at anode 23 remains substantially unchanged. To assure that anode 23 is still at cathode potential, switch 19 may be closed momentarily while plate 15 is in contact with the electret. The needle of instrument 27 should now be in the position of maximum deflection.

With switch 19 opened, lever 16 is released and plate 15 moves a predetermined distance away from the electret. As the charged plate moves away from the electret, the voltage between the plate and the electret increases due to the decrease in capacitance. Since plate 15 is negatively charged, it assumes a large negative potential which charges capacitor 18 and creates a negative potential at anode 23 which is proportional to the amount of the apparent charge of the electret. The negative potential at the anode reduces the amount of current to grid 22, and thereby causes instrument 27 to read downscale by an amount proportional to the measured charge.

If the upper surface of electret 9 happens to be of negative polarity, positive charges are induced in plate 15 as the plate is moved toward the electret. In this case, meter 27 reads downscale when the lever 16 is operated to bring plate 15 into contact with the electret, and the meter reading is obtained at this time without closing swtich 19.

This apparatus is extremely easy to operate, since no precautions need be taken as to the polarity of the electret placed within the holder. The only necessary precaution is to take the meter reading without closing switch 19 if the meter reads downscale when lever 16 is operated. If the meter does not read downscale at this time, switch 19 is closed momentarily, then lever 16 is released and the reading is obtained.

In measuring the radioactive contamination of a surface, the measurement of alpha rays emitted by the surface has been relatively difficult because of the fact that alpha rays have low penetrating power, and therefore admission of the rays to conventional counting tubes presents a difficulty. Tubes having very thin windows have been employed, but these are not completely satisfactory.

The apparatus shown in Fig. 5 provides an improved means for measuring such radiations. A metal container 30 is open at one end as shown. In use, the open side of container 30 is placed upon the surface from which radiation emission is to be measured, so that the container encloses a fixed amount of air or other gas. Inside the container there is an electrically insulating holder 31 which supports a charged electret 32 so that two opposite sides of the electret are exposed to the gas within the container. Alpha rays or other ionizing radiations emitted by the contaminated surface produce ions within the gas enclosed container, and these ions are attracted to the surface of the electret by the electret charges. The ions so attracted produce surface charges which reduce the apparent charge of the electret, as hereinbefore explained.

The amount of this reduction in the apparent charge is determined by measuring the charge of the electret before and after exposure to the radiations. The apparatus shown in Figs. 3 and 4 may be used for this purpose. The efficiency of the Fig. 5 apparatus as a detector of alpha rays is especially good, because there is no absorbing material between the emitting surface and the region within which ions are produced. By using this method, a large surface, such as an aeroplane wing or fuselage, can be quickly surveyed for radioactive contamination.

An improved electret holder for use in measuring ionizing radiations is shown in Figs. 6 and 7. Referring now to Fig. 6, a fixed amount of gas is enclosed in a closed container 33 having a cover 34. A charged, disc-shaped electret 35 is supported within the container by an electrode 36 which is in contact with one face of the electret, as shown. An insulating bushing 37 electrically insulates electrode 36 from container 33. Electrode 36 is held in place by a screw 38 attached thereto which passes through the bushing and which is secured at its outer end by a washer 39 and a nut 40.

A second electrode 41 extends through cover 34 as shown, and is attached thereto by a metal bellows 42. The bellows provides a gas-tight seal between the electrode and the cover, while it permits relative motion of electrode 41 and electret 35. When the bellows is compresed, electrode 41 comes into contact with the upper face of electret 35, as illustrated in Fig. 6. The bellows may be held compressed by a U-shaped spring clamp 43 which also completes an electrical short circuit between electrodes 36 and 41. With clamp 43 in place, electret 35 is short circuited and will retain its charge without appreciable change over long periods of time.

When ionizing radiations are to be measured, clamp 43 is removed and the spring action of bellows 42 then forces electrode 41 up away from electret 35, as shown in Fig. 7. The charge of the electret then produces an electrostatic field which attracts to the electret surface any ions produced in the gas within container 33, thereby reducing the apparent charge of the electret. After the desired amount of exposure, clamp 43 may be replaced to short circuit the electret and prevent further change in the electret charge.

An advantage of the apparatus shown in Figs. 6 and 7 is that the container need never be opened, so that ions from the outside have no opportunity to enter the container at any time. The charge of the electret may be measured while the electret remains inside the closed container. For example, this may be done as follows: Clamp 43 is placed upon the holder as shown in Fig. 6. This provides an electrical short circuit which brings electrodes 36 and 41 to the same potential. However, these electrodes are electrically charged because the electret charges induce opposite charges in the adjacent electrodes. Clamp 43 is then removed, which permits electrode 41 to move up away from electret 35 a predetermined distance fixed by the dimensions of the container.

This movement of electrode 41 decreases the capacitance between the two electrodes, and since the charges remain the same because the electrodes are insulated from each other by insulating bushing 37, there is a voltage change which produces a potential difference between electrodes 41 and 36. This potential difference, which is proportional to the apparent charge of the electret, can be measured with a suitable electrometer.

It will be appreciated that the electrometer shown in Figs. 3 and 4 can easily be adapted for use with the container shown in Figs. 6 and 7. Preferably this is done by adapting holder 10, Fig. 3, to receive the top portion of electrode 41, Fig. 7. The plate 15, Fig. 4, is then shaped to engage the outer end of screw 38, Fig. 7. Thus when lever 16 is operated, plate 15 pushes against screw 38 and brings electret 35 into contact with electrode 41. When lever 16 is released, the electret moves a fixed distance away from electrode 41 and thus produces at electrode 36, and consequently at plate 15, a potential which is proportional to the charge upon the electret, and an indication of the apparent charge value is provided by meter 27 as hereinbefore explained.

Also, electret 35 can be charged and recharged without removing it from its container, by pressing electrode 41 against the electret and applying suitable voltage between electrodes 41 and 36. During this charging operation, the electret may be heated and allowed to cool, in the usual manner, by placing the entire container in a suitable furnace. Some recharging can also be accomplished by repeatedly bringing electrode 41 into contact with the electret while short circuiting the electrodes, which tends to "strip" some of the neutralizing surface charges from the electret. Thirty or more cycles of this stripping may replace a substantial amount of the electret's original apparent charge. A single cycle of the short circuiting operation, as occurs each time a measurement is made, produces a negligible change in apparent charge.

Another improved apparatus for measuring ionizing radiations is shown in Figs. 8 and 9. Container 44, which encloses a fixed amount of gas, may be shaped like the case of a wrist watch, as shown. This permits the apparatus to be worn upon the wrist, which is advantageous since it has been found that the hands of persons working with X-rays or radioactive materials are generally exposed to more radiation than other parts of the body. Container 44 may have a removable back 45 to permit access to the apparatus inside the case, and may have a glass cover 46 to permit observation of the interior mechanism. Preferably, the inner surface of glass cover 46 is lightly coated with a metallic film 47 to provide an electrically conductive surface. Since the remainder of the container is metal, complete electrostatic shielding is provided. Film 47 is sufficiently thin, however, to be transparent, so that it does not substantially interfere with observation of the internal mechanism.

Inside the container is a metallic member 48 which is shaped to form two pairs of substantially quadrant-shaped plates 49, as shown. A flat electret 50 is supported upon a shaft 51, the ends of which operate in jewelled bearings 52, so that the shaft and the electret may rotate about an axis perpendicular to the plane of of the flat electret. Electret 50 has two flat, substantially quadrant-shaped wings 53 extending outward in opposite directions from the axis of rotation, so that upon rotation of the electret, wings 53 pass between the respective plates of each pair of plates 49, and the distance between wings 53 and plates 49 varies as the electret is rotated. A spiral spring 54 is attached at one end to shaft 51, and is attached at the other end to member 48 through lug 55. Spring 54 biases the electret for rotation away from the position of maximum overlapping of wings 53 and plates 49; that is, away from the position in which the center line of the electret is parallel to the center line between the two pairs of plates 49.

Although the minimum overlapping of wings 53 and plates 49 occurs when the center line of the electret is at an angular position 90° from the center line between plates 49, this is a dead center position at which the torque due to electrostatic forces, hereinafter described, is zero, and from which the electret may rotate with equal probability in either direction. Therefore, it is preferable to adjust spring 54 so that it tends to rotate the electret to a position in which its center line has an angular position of only about 60° from the center line between plates 49. Also, wings 53 and plates 49, although preferably substantially quadrant shaped, may respectively cover angles of only about 60° rather than 90° as shown.

Whatever the polarity or the pattern of the charges upon electret 50 may be, the electret charges produce electrostatic forces between wings 53 and plates 49 which tend to rotate the electret to the position of maximum overlapping of the wings and the plates; that is, to the position in which the center line of the electret is parallel to the center line between the two pairs of plates 49. Thus the spring bias and the electrostatic charges respectively tend to rotate the electret to positions which are a predetermined angular distance apart. The angular position assumed by the electret is an intermediate one, at which the two forces in opposite directions are balanced. This angular position depends upon the effective charge of the electret.

When the electret is fully charged, electret 50 assumes a position in which almost the entire volume of wings 53 is between top and bottom plates 49. Thus very little of the electret can be seen through glass cover 46. When the apparatus is exposed to ionizing radiations, ions are produced within the container and are attracted to the surface of the electret. This reduces the apparent charge of the electret, and thus reduces the electrostatic attraction between wings 53 and plates 49. Therefore, the electret rotates clockwise, and more of the electret becomes visible through the glass cover.

By observing the changes in angular position of the electret, one can determine the amount of radiation to which the apparatus is exposed. Suitable marks or indications 54 may be placed upon the upper surface of the electret to provide an accurate indication of the electret's angular position. The charge of the electret is renewed by removing the electret from the container and recharging in any suitable manner.

Having described the principle of this invention and the best modes in which I have contemplated applying that principle, I wish it to be understood that the examples described are illustrative only, and that other means can be employed without departing from the true scope of the invention.

What I claim as new and desire to secure by Letters Patent of the United States is:

1. Apparatus for measuring ionizing radiations, comprising a charged electret, a closed container which contains said electret and a fixed amount of gas, and means for selectively short circuiting said electret without opening said container.

2. Apparatus for measuring ionizing radiations, comprising a disc-shaped charged electret, a closed container which contains said electret and a fixed amount of gas, a first electrode in contact with one face of said electret supporting said electret within said container and insulated therefrom, a second electrode, a bellows attaching said second electrode to said container to maintain said container gas-tight while permitting relative motion between said second electrode and said electret, said second electrode contacting the other face of said electret when said bellows is compressed, and means for selectively holding said bellows compressed and simultaneously short circuiting said first and second electrodes.

3. Apparatus for measuring ionizing radiations emitted from surfaces, comprising a container having an open side adapted to enclose a fixed amount of gas when such open side is placed upon such surface, an electret, and insulating means supporting said electret within said container with at least two sides of the electret exposed to the gas enclosed within said container.

4. Apparatus for measuring the apparent charge of an electret, comprising an electret holder adapted to contact one face of the electret, a movable plate adapted to contact the opposite face of the electret or to be positioned a predetermined distance from such face selectively, an electron discharge tube having a cathode, a grid, and an anode, said cathode being connected to said holder and said anode being connected to said movable plate, an ammeter connected between said grid and said cathode, and means to apply positive potential to said grid.

5. Apparatus for measuring the apparent charge of an electret, comprising an electret holder adapted to contact one face of the electret, a movable plate adapted to contact the opposite face of the electret or to be positioned a predetermined distance from such face selectively, a capacitor and a short circuiting switch in parallel therewith connected between said movable plate and said holder, an electron discharge tube having a cathode, a grid, and an anode, said cathode being connected to said holder and said anode being connected to said movable plate, an ammeter connected between said grid and said cathode, and means to apply positive potential to said grid.

6. Apparatus for measuring ionizing radiations, comprising a closed electrically conductive case enclosing a fixed amount of gas, a flat electret within said case, means supporting said electret for rotation about an axis perpendicular to its plane, said electret having a plurality of wings extending outward from said axis, a plurality of fixed plates within said case so disposed that at one position of said electret each wing of the electret is adjacent to a respective one of said plates and so that rotation of the electret about its axis changes the distance between said wings and said plates, and means biasing said electret for rotation away from a position of minimum distance between said wings and said plates.

7. Apparatus for measuring ionizing radiations, comprising a closed electrically conductive case enclosing a fixed amount of gas, a flat electret within said case, means supporting said electret for rotation about an axis perpendicular to its plane, said electret having two flat, substantially quadrant-shaped wings extending outward in opposite directions from said axis, two pairs of substantially quadrant-shaped plates within said case disposed on opposite sides of said axis so that upon rotation of said electret said wings pass between the respective plates of each pair, the distance between said wings and said plates varying as the electret is rotated, and spring means biasing said electret for rotation away from a position of minimum distance between said wings and said plates.

8. Apparatus for measuring ionizing radiations, comprising a closed electrically conductive case enclosing a fixed amount of gas, said case being shaped substantially like a wrist watch case and having an electrically conductive transparent top, a flat electret within said case, means supporting said electret for rotation about an axis perpendicular to its plane, said electret having two flat substantially quadrant-shaped wings extending outward in opposite directions from said axis, a single metallic member within said case shaped to form two pairs of substantially quadrant-shaped plates disposed on opposite sides of said axis so that upon rotation of said electret said wings pass between the respective plates of each pair, the distance between said wings and said plates varying as the electret is rotated, and spring means biasing said electret for rotation away from a position of minimum distance between said wings and said plates.

9. Apparatus for measuring ionizing radiations, comprising a charged electret, a container for said electret, said container also containing a predetermined amount of an ionizable medium, means for selectively short circuiting said electret, and means operable after removal of said short-circuiting means to measure the change of apparent charge of said electret after exposure of said medium to a source of ionizing radiations.

10. The combination comprising a charged electret, a container for said electret, a pair of spaced electrodes for said electret, one said electrode supporting said electret in said container and insulated therefrom, expansible means connecting the other electrode to said container, said other electrode being adapted to be brought into contact with and withdrawn from said electret in response to compression and expansion of said expansible means, and means for selectively holding said expansible means compressed.

11. The method of indicating the presence of ionizing radiations, which comprises exposing to such radiations a container which contains a charged electret and a fixed amount of gas ionizable by such radiations, deriving a current from said electret in proportion to the decrease in apparent charge thereof resulting from such exposure, and indicating the current.

References Cited in the file of this patent

UNITED STATES PATENTS

| Number | Name | Date |
|---|---|---|
| 1,181,423 | Bangert | May 2, 1946 |

OTHER REFERENCES

The Use of Electrets in Electrical Instruments by Andrew Gemant published in Review Scientific Instruments, vol. 11, February 1940, pages 65–71.

Electrets by Andrew Gemant, published in Physics Today dated March 1949, pages 8–13.

"Frozen Electricity; the Electret; Improved Electrets" by Dickerson, Laughter and Padgett published by Radio Electronics, November 1945, May 1948, April 1949.